(12) United States Patent
Gupta

(10) Patent No.: US 12,518,104 B2
(45) Date of Patent: Jan. 6, 2026

(54) SYSTEM AND METHOD FOR ANALYZING TRENDS IN A CATEGORICAL DATASET USING SEMANTIC INFUSION

(71) Applicants: Robert Bosch GmbH, Stuttgart (DE); Robert Bosch Engineering and Business Solutions Private Limited, Bangalore (IN)

(72) Inventor: Rishabh Gupta, Uttar Pradesh (IN)

(73) Assignees: Robert Bosch GmbH, Stuttgart (DE); Robert Bosch Engineering and Business Solutions Private Limited, Bangalore (IN)

( * ) Notice: Subject to any disclaimer, the term of this patent is extended or adjusted under 35 U.S.C. 154(b) by 293 days.

(21) Appl. No.: 18/189,594

(22) Filed: Mar. 24, 2023

(65) Prior Publication Data
US 2023/0315995 A1    Oct. 5, 2023

(30) Foreign Application Priority Data

Mar. 31, 2022    (IN) .............................. 202241005163

(51) Int. Cl.
 *G06F 40/30* (2020.01)
 *G06F 16/3332* (2025.01)
 *G06F 16/35* (2025.01)

(52) U.S. Cl.
 CPC .......... *G06F 40/30* (2020.01); *G06F 16/3335* (2019.01); *G06F 16/35* (2019.01)

(58) Field of Classification Search
 CPC ....... G06F 40/30; G06F 16/3335; G06F 16/35
 See application file for complete search history.

(56) References Cited

U.S. PATENT DOCUMENTS

| | | | |
|---|---|---|---|
| 8,117,227 B2 * | 2/2012 | Montangero | G06Q 30/02 |
| | | | 707/769 |
| 11,429,897 B1 * | 8/2022 | Cobb | G06F 17/16 |
| 2020/0265074 A1 * | 8/2020 | Tang | G06F 16/3344 |

FOREIGN PATENT DOCUMENTS

IN    202041055755 A    6/2022

* cited by examiner

*Primary Examiner* — Linda Wong
(74) *Attorney, Agent, or Firm* — Maginot, Moore & Beck LLP

(57) ABSTRACT

A method for detecting semantic trends within the categorical datasets from text-based documents includes using a processing module to obtain the plurality of text-based documents and perform a basic cleaning of each of the plurality of text-based documents. A semantic infusion module may generate an infused sentence in each of the plurality of text-based documents by inserting a word "A_class $(C_i)$_time $(T_j)$" based on a computed infusion frequency value $(I_{freq})$. A pattern generation module is configured to generate semantic trends by extracting the trending items from the word vector representation created by a word vector module, for each word of each infused sentence of each of the plurality of text-based documents.

8 Claims, 2 Drawing Sheets

SYSTEM AND METHOD FOR ANALYZING TRENDS IN A CATEGORICAL DATASET USING SEMANTIC INFUSION

This application claims priority under 35 U.S.C. § 119 to application no. IN 202241005163, filed on Mar. 31, 2022 in India, the disclosure of which is incorporated herein by reference in its entirety.

FIELD

The present subject matter relates, in general, to a system and method for detecting semantic trends using the Semantic Infusion technique, specifically for Trends Analysis for Categorical Data Applications.

BACKGROUND

Text-based documents are used for text analytics activities. In the text analytics activities, unstructured text-based documents are understood contextually and further transformed into meaningful data for analysis.

In recent years, businesses such as CRM, KPO, Knowledge Management, and Web Monitoring services have witnessed a large inflow of structured text streams. This presents an opportunity to use this data to discover "Emerging Topics" or "Trends" and analyze their dynamics, which can help in the decision-making processes. The traditional techniques for emerging trends analysis are the first choice to perform the task and these techniques can further be classified as either a supervised or an unsupervised method. In literature, existing solution have proposed supervised systems that use local and topical features of the words to predict the trends. To overcome the need of defining the features, unsupervised systems use volatility measures to capture change in the meaning of the terms by comparing their global contexts across different time slices. Existing solution have extensively used Latent Dirichlet Allocation (LDA), a generative probabilistic model, to detect trends either by clustering words around an entity or by detecting their evolution over time. In addition, these solutions have used measures of association such as Positive Pointwise Mutual Information (PPMI) and Pointwise Mutual Information (PMI) as the co-occurrence frequency-based scores to detect trends by creating word embeddings across different time slices. Further, such solutions attempt to solve the alignment problem in this domain by either mapping embeddings for same words across time slices or jointly developing the embeddings across time slices. In practice, the traditional trend analysis techniques are largely biased towards term frequency-based schemes that perform poorly especially in the cases of the domain-specific corpora where the dataset is not distributed uniformly across the time slices.

Indian patent application 202041055755 discloses methods and systems for determining and removing noisy sentences from text-based documents for context building.

BRIEF DESCRIPTION OF THE DRAWINGS

The detailed description is provided with reference to the accompanying figures, wherein.

DETAILED DESCRIPTION

Figure 1:
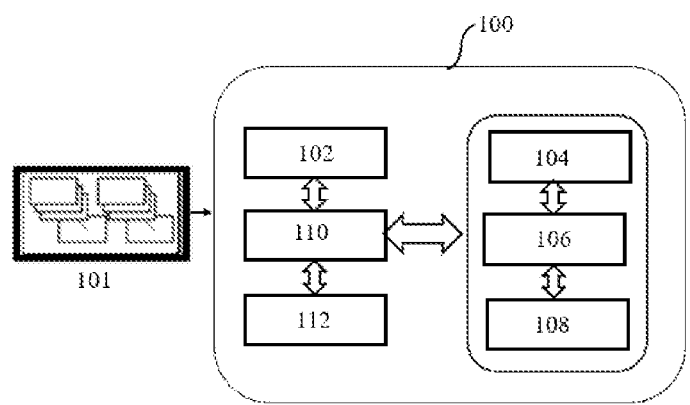
FIG. 1 illustrates a system environment for detecting semantic trends within the categorical datasets from text-based documents, in accordance with an example implementation of the present subject matter.

The present subject matter describes example methods and systems for detecting semantic trends within the categorical datasets from text-based documents for context trend analysis. In the example methods and systems described herein, overcomes the frequency-based bias associated with traditional trend analysis and detects semantically meaningful trends for a given time-sliced categorical a plurality of text-based documents.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 2:
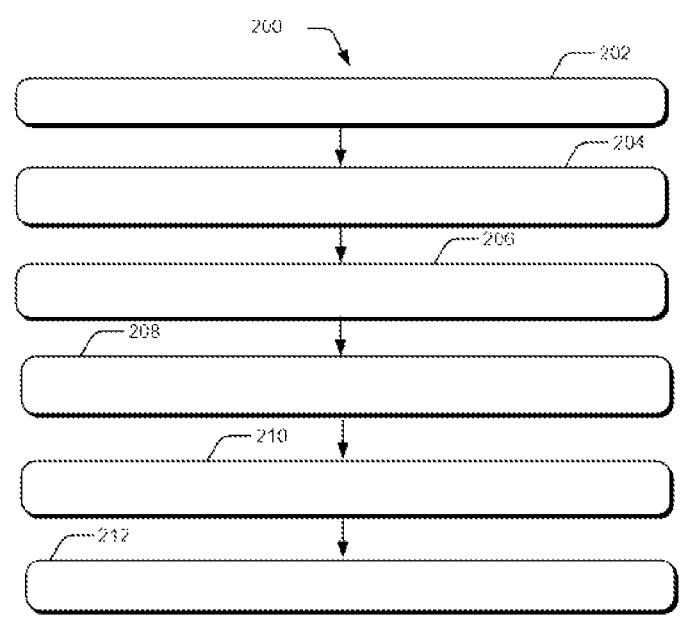
FIG. 2 illustrates a flow chart of a method for detecting semantic trends within the categorical datasets from text-based documents, in accordance with an example implementation of the present subject matter.

The manner in which the methods and systems are implemented are explained in detail with respect to FIGS. 1-2. While aspects of described methods and systems can be implemented in any number of different devices, environments, and/or implementations, the examples are described in the context of the following system(s). It is to be noted that drawings of the present subject matter shown here are for illustrative purposes and are not drawn to scale.

FIG. 1 illustrates a system 100 environment for detecting semantic trends within the categorical datasets from text-based documents, in accordance with an example implementation of the present subject matter. The system 100 may be a computing system found in a wide range of electronic device types to process signals and/or states representative of a diverse of content types for a variety of purposes. Examples of the system 100 may include, but are not limited to, a laptop, a notebook computer, a desktop computer, a server, a cellular phone, and a personal digital assistant.

The system 100 may include a processing module 102. The processing module 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided through the use of dedicated hardware as well as hardware capable of executing computer-readable instructions.

Further, the system 100 may include a semantic infusion module 104, a word vector module 106 and a pattern generation module 108, coupled to the processing module 102. The modules 104, 106 and 108 may be implemented as a combination of hardware and programming, for example, programmable instructions to implement a variety of functionalities of the modules 104, 106 and 108. In examples described herein, such combinations of hardware and programming may be implemented in several different ways. For example, the programming for the pattern generation module 108 may be executable instructions. Such instructions may be stored on a non-transitory machine-readable storage medium which may be coupled either directly with the system 100 or indirectly (for example, through networked means). In the present examples, the non-transitory machine-readable storage medium may store instructions that, when executed by the processor, implement modules 104, 106 and 108. In other examples, the modules 104, 106 and 108 may be implemented as electronic circuitry.

The modules 104, 106 and 108, amongst other things, includes routines, programs, objects, components, and data structures, which perform particular tasks or implement particular abstract data types. The modules 104, 106 and 108, may also be implemented as, signal processor(s), state machine(s), logic circuitries, and/or any other device or component that manipulates signals based on operational instructions. Further, the modules 104, 106 and 108, can be implemented by hardware, by computer-readable instructions executed by a processing unit, or by a combination thereof.

Further, the system 100 includes a storage device 110. The storage device 110 may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The storage device 110 may store an activity data 103. In an example, the activity data 103 includes a plurality of text-based documents $D=\{d_k\}_{\{k=1\}}^N$ D with each document $d_k$ having a category to a class ci in the set of M classes $C=\{c_i\}_{\{i=1\}}^M$ and a time class $t_j$ in the set of L classes $T=\{t_j\}_{\{j=1\}}^L$, and an infusion frequency value ($I_{freq}$).

In an example, the system 100 includes interface(s) 112. The interface(s) 112 may include a variety of interfaces, for example, interface(s) 112 for users. The interface(s) 112 may include data output devices. The interface(s) 112 may facilitate the communication of the system 100 with various communication and electronic devices. In an example, the interface(s) 112 may enable wireless communications between the system 100, such as a laptop, and one or more other computing devices (not shown).

Description hereinafter describes how detecting semantic trends within the categorical datasets from text-based documents is performed by the system 100. The processing module 102 obtains a plurality of text-based documents D (101), where $d_k$ indicates the $k^{th}$ text-based document of the of the N number of text-based documents, where N is any positive number. In an example, N=1000. Each text-based document $d_k$ is a document that has text, such as names of vehicle parts, program source code, batch files and is readable by the processing module 102. In an example, the plurality of text-based documents D (101), may be obtained by converting a plurality of voice notes into text documents. Such a conversion may be performed by an automatic speech recognition technique. Each text-based document $d_k$ includes a set of sentences $j_{dk}$ and belongs to a class $c_i$ from amongst a set of M classes defined by $C=\{c_i\}_{\{i=1\}}^M$. In case the value of M is 3, the set of M classes is $\{c_1, c_2, c_3\}$. The class $c_i$ is a technical field to which the text-based document $d_k$ belongs. Each text based document $d_k$ belongs to a category class $c_i \in C$ such that $C=\{c_i\}_{i=1}^M$ and a time class $t_j \in$ such that $T=\{t_j\}_{j=1}^L$. The system 100 detects top-k semantic trending items for each pair of $C_i T_j$. For example, in automobiles, all text-based documents referring to a seat belt can be considered of one class.

Further, at least one of symbols, special characters, and predefined stop words are removed from each sentence of the set of sentences $j_{dk}$ of each document $d_k$ of the plurality of text-based documents D (101), by the processing module 102 for basic cleansing of the plurality of text-based documents D. Symbols may represent idea, object, or relationship using a mark or a sign. A special character is a character that is not an alphabetic or numeric character, for example, punctuation marks are considered as special characters. A stop word is a word that is not related to the context of the document $d_k$. For each class $c_i$, a list of stop words may be predefined and based on the class $c_i$ of the document $d_k$, predefined stop words are removed from each sentence of the set of sentences $j_{dk}$ of each document $d_k$. In an example, if the plurality of text-based documents D belongs to a class of English language, articles and prepositions may be considered as predefined stop words and can be removed from the plurality of text-based documents D for basic cleansing.

The processing module 102 is configured to identify a category class ($C_i$) and a time class ($T_j$) to which each of the plurality of text-based documents (101), belong. The category class $c_i$ may be an indicative of a context to which text of a text-based document $d_k$ is associated. In an example of automobile domain, if the plurality of text-based documents D (101), relate to an engine assembly, then the class $c_i$ may be identified as "engine assembly". Further, the time class ($T_j$) may be an indicative of a year, month or date to which text of a text-based document $d_k$ is associated.

Further, the semantic infusion module 104 is configured to determine for each sentence in each of the plurality of text-based documents $d_k$, a number of words (L) in the respective sentence. Upon identifying the class $c_i$ of each cleaned text-based document $d_k$, the processing module 102 transmits this information to semantic infusion module 104, for determining a number of words (L) for each sentence in each text-based document $d_k$ of the plurality of text-based documents D (101). The determined number of words (L) is an indicative of a cleaned length of each sentence.

Furthermore, the semantic infusion module 104 is configured to compute an infusion frequency value ($I_{freq}$) based on the number of words (L) determined for each sentence of each text-based document $d_k$ of the plurality of text-based documents D (101). In an example, the infusion frequency value ($I_{freq}$) is computed as one of [ceil{(log$_2$ L)/2}], {ceil($\sqrt{(L)}$)}, $$\{\mathrm{ceil}(\sqrt[3]{(L)})\},$$

and {ceil($\sqrt{(L/2)}$)}. The ceil(p) is a function that returns an integer value which is an upper round-off of the value of p, in case the value of p is not an integer. In the present case, if the infusion frequency value ($I_{freq}$) is computed as [ceil{(log$_2$ L)/2}], a value of {(log$_2$ L)/2} is rounded off to an integer value that is closest and bigger than the value of {(log$_2$ L)/2}. Computation of the infusion frequency value ($I_{freq}$) as one of [ceil{(log$_2$ L)/2}], {ceil($\sqrt{(L)}$)}, $$\{\mathrm{ceil}(\sqrt[3]{(L)})\},$$

and {ceil(L/2)} ensures that the infusion frequency value ($I_{freq}$) is not proportional to the determined number of words (L), i.e. the cleaned length of each sentence. In an example, the infusion frequency value ($I_{freq}$) is considered as 1 for each sentence of each text-based document $d_k$ of the plurality of text-based documents D (101).

In one embodiment, the sematic infusion module 104 performs the semantic infusion technique. The purpose of using this technique is to infuse additional meta-data (referred to as Anchors) within the clean sentences so that the vector space (as generated by Word2Vec Gen (W) module 106) can be partitioned into the labeled regions. Given a clean sentence of length=len, of a document $d_k$ and category class $C_i$ and a time class $T_j$, the semantic infusion technique defines the Infusion Frequency ($I_{freq}$), where $I_{freq} \in R$, as the count of anchors to be infused in the clean sentence. ensures that the $I_{freq}$ not $\propto$ len. This helps in making this technique a near-lossless in nature.

$$I_{freq} = (\lceil \log_2(len)/2 \rceil) \quad \text{equation (1)}$$

Further the sematic infusion module 104 further determines the $I_{freq}$ number of non-consecutive random numbers from a set $[0, (L-1)]$. In an example, if the value of L is 4, the infusion frequency value ($I_{freq}$) is computed as 1 using [ceil{($\log_2$ L)/2}]. Thereafter 1 (equal to $I_{freq}$ number) random number is determined from a set $[0, (4-1)]$, i.e., $[0, 3]$. With said example, the random number is determined as one of 0, 1, 2, and 3. In case $I_{freq}$ is computed as 2, then 2 non-consecutive random numbers can be determined from a set $[0, (L-1)]$.

Upon determining the $I_{freq}$ number of non-consecutive random numbers from a set $[0, (L-1)]$, the sematic infusion module 104 generates an infused sentence by inserting a word "A_class ($C_i$)_time ($T_j$)" prior to a word at a position in the respective sentence indicated by each of the determined non-consecutive random numbers, where in "A_$C_iT_j$", $C_i$ is the category class and $T_j$ is time class, to which the document $d_k$ belongs. In an example, for a document $d_k$ of length len and belonging to a category class $C_i$ and a time class $T_j$, an Anchor term A_$C_iT_j$ in infused at P random and non-consecutive positions within the document, where $P=\lceil (\log_2(len))/2 \rceil$.

Further, the word vector module 106 is configured to generate a word vector for each word of each infused sentence of each of the plurality of text-based documents. The word vector module 106 generates a word vector for each word of each infused sentence of each of the plurality of text-based documents D (101). Each word is replaced with a vector of a multiple dimensions and vector size of each word is the same. Therefore, the infused sentence after replacement of each word with a respective vector is a matrix representing each word as row and dimension of each vector as column. The vectors are chosen such that a simple mathematical function (the cosine similarity between the vectors) indicates the level of semantic similarity between the words represented by the vectors. In an example, the word vector may be generated using an unsupervised algorithm. In an example, the unsupervised algorithm may be based on a Word2Vec technique.

Upon generating the word vector for each word of each infused sentence of each of the plurality of text-based documents D (101), the pattern generation module 108 generates a semantic trend. The pattern generation module 108 is configured to generate semantic trends by extracting the trending items from the word vector representation created by word vector module 106. The pattern generation module 108 for each of the plurality of text-based documents D, extracts the trending items from the word vector representation in a two-step process in which first, for each pair of $c_it_j$ such that $ci \in C$ and $t_j \in T$, the corresponding anchor A_$c_it_j$ is identified. In second step, the top-k words are extracted from the word vector representation which are closest to the A_$c_it_j$ in the vector space. These words represent the top-k semantic trends for the category class $C_i$ and the time class $T_j$.

In one embodiment, for a plurality of domain-specific documents $D=\{d_k\}^N_{k=1}$ in which each document $d_k$ belongs to a category class $C_i \in C$ such that $C=\{c_i\}^M_{i=1}$ and a time class $T_j \in T$ such that $T=\{t_j\}^L_{j=1}$. The pattern generation module 108 further configured to detect top-k trending items for each pair of $c_it_j$.

In one embodiment the system 100 gets regularly updated for the new documents in the time class $t_{j+1}$ by re-sampling the topic assignments for all documents in a fixed-sized sliding window L. In the re-sampling process, $\theta$ and $\phi$ of the model in time class $t_j$ are used as $\alpha$ and $\beta$ respectively, for the model in time class $t_{j+1}$. A contribution factor c such that $c \in [0, 1]$ determines the degree of contribution of learned parameters to the priors of the new model1. After all iterations, each time class is assigned a set of topics using $\theta$, and each topic is characterized with a set of words (trending items) using $\phi$, from the text-based documents makes the text-based documents contextual understandable.

FIG. 2 illustrates a flow diagram of a method 200 for detecting semantic trends within the categorical datasets from text-based documents, according to an example. The method 200 can be implemented by processor(s) or device (s) through any suitable hardware, a non-transitory machine readable medium, or a combination thereof. Further, although the methods 200 is described in context of the system that is similar to the aforementioned system 100, other suitable devices or systems may be used for execution of the method 200.

In some examples, processes involved in the method 200 can be executed based on instructions stored in a non-transitory computer-readable medium. The processing module 102 may be communicatively coupled to the non-transitory computer-readable medium so as to fetch and execute computer-readable instructions from the non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 2, at block 202, a plurality of text-based documents $D=\{d_k\}_{\{k=1\}}^N$ is obtained by the processing module 102 for detecting semantic trends within the categorical datasets from text-based documents, from the plurality of text-based documents D (101). In an example, a plurality of voice notes may be received by the plurality of text-based documents may be obtained by the processing module 102, which are then converted into text documents for further proceedings. Each text-based document $d_k$ of the plurality of text-based documents D includes a set of sentences $j_{dk}$ and belongs to a class $c_i$ in a set of M classes defined by $C=\{c_i\}_{\{i=1\}}^M$ where M may have any value less than N, for example, any value less than 10.

At block 204, the method 200 may include removing at least one of symbols, special characters, and predefined stop words from each sentence of the set of sentences $j_{dk}$ of each document $d_k$ of the plurality of text-based documents for basic cleansing.

At block 206, the method 200 may include identifying a category class ($C_i$) and a time class ($T_i$), to which each cleaned text-based document $d_k$ of the plurality of text-based documents D belong, by the processing module 102. For example, if a clean sentence is "right front wheel locked vehicle spin response anti-lock brakes", the class $c_i$ may be identified as "Service-Brakes", since the clean sentence indicates about the brakes.

At block 208 of the method 200, a number of words (L) for each sentence in each text-based document $d_k$, which is a cleaned length of each sentence, are determined by the semantic infusion module 104. Further, based on the determined number of words (L), an infusion frequency value ($I_{freq}$) is computed. In an example, the infusion frequency value ($I_{freq}$) is computed as one of [ceil{(log$_2$ L)/2}], {ceil ($\sqrt{(L)}$)}, $$\{ceil(\sqrt[3]{(L)})\},$$

and {ceil(L/2)}. In a specific example, the processing module 102 may assume the infusion frequency value ($I_{freq}$) as 1 for each sentence of each text-based document $d_k$.

Further, the $I_{freq}$ number of non-consecutive random numbers are determined from a set [0, (L−1)] and an infused sentence is generated by inserting a word "A_class ($C_i$)_time ($T_j$)" prior to a word at a position in the respective sentence indicated by each of the determined non-consecutive random numbers, where in "A_$C_i T_j$", $C_i$ is the category class and $T_j$ is time class, to which the document $d_k$ belongs. For example, for a clean sentence "right front wheel locked vehicle spin response anti-lock brakes" of a document class $c_i$=Service-Brakes is processed as "right A_Service-Brakes front wheel locked vehicle spin A_Service-Brakes response anti-lock brakes".

At block 210, the method 200 may include generating a word vector for each word of each infused sentence of each of the plurality of text-based documents D, by a word vector module 106. Thus, each word is replaced with a vector. Each vector is chosen such that a simple mathematical function (the cosine similarity between the vectors) indicates the level of semantic similarity between the words represented by the vectors and thus the vectors capture the co-occurrence statistics of the words, such that, words that typically co-occur or words that share similar context are closer to each other in a vector space. In an example, the word vector may be generated based on a Word2Vec technique.

At block 212, the method 200 may include generating semantic trends by extracting the trending items from the word vector representation created for each word of each infused sentence of each of the plurality of text-based documents, in the step 210, by a pattern generation module 108. The pattern generation module 108 for each of the plurality of text-based documents D, extracts the trending items from the word vector representation in a two-step process in which first, for each pair of $c_i t_j$ such that $c_i \in C$ and $tj \in T$, the corresponding anchor A_$c_i t_j$ is identified. In second step, the top-k words are extracted from the word vector representation which are closest to the A_$c_i t_j$ in the vector space. These words represent the top-k semantic trends for the category class $C_i$ and the time class $T_j$.

The present subject matter is employed to aid text analytics activities to operate seamlessly by identifying trends for categorical data using a semantic infusion technique, from the input text-based documents. With this technique, the system 100 overcomes the frequency-based bias associated with traditional trend analysis techniques and detect semantically meaningful trends for a given time-sliced categorical corpus of text-based documents.

Although aspects for the present disclosure have been described in a language specific to structural features and/or methods, it is to be understood that the appended claims are not limited to the specific features or methods described herein. Rather, the specific features and methods are disclosed as examples of the present disclosure.

The invention claimed is:

1. A method for detecting semantic trends within the categorical datasets from text-based documents, the method comprising:
   obtaining, with a processing module, digital data corresponding to a plurality of text-based documents comprising a plurality of sentences;
   removing, with the processing module, digital data corresponding to at least one of symbols, special characters, and predefined stop words from each sentence of the plurality of sentences of;
   identifying, with the processing module, a category class (Ci) and a time class (Tj) to which each of the plurality of text-based documents is associated;
   determining for each sentence, with a semantic infusion module, a number of words (L) in a respective sentence of the plurality of sentences;
   computing, with the semantic infusion module, an infusion frequency value (Ifreq) based on the number of words (L) and determining the Ifreq of non-consecutive random numbers from a set (0, (L−1));
   generating, with the semantic infusion module, an infused sentence by inserting digital data corresponding to a word "A_class (Ci)_time (Tj)" prior to a word at a position in the respective sentence indicated by each of the determined non-consecutive random numbers;
   generating, with a word vector module, digital data corresponding to a word vector for each word of each infused sentence of each of the plurality of text-based documents;
   generating, with a pattern generation module, digital data corresponding to semantic trends by extracting the trending items from the word vector generated for each word of each infused sentence of each of the plurality of text-based documents; and
   performing text analytics activities on the digital data corresponding to the plurality of text-based documents using the digital data corresponding to the generated semantic trends.

2. The method as claimed in claim 1, further comprising generating of the word vector using a Word2Vec technique.

3. The method as claimed in claim 1, wherein the Ifreq is computed as one of ceil{(log$_2$L)/2}, {ceil{$\sqrt{(L)}$}, $$\{ceil(\sqrt[3]{(L)})\},$$

and {ceil(L/2)}.

4. The method as claimed in claim 1, wherein the category class ($C_i$) is indicative of a context to which text of an associated text-based document of the plurality of text-based documents is associated.

5. The method as claimed in claim 1, wherein the time class ($T_j$) is indicative of a year, month, or date to which text of an associated text-based document of the plurality of text-based documents is associated.

6. A system for detecting semantic trends within categorical datasets from text-based documents, the system comprising:

a processing module configured to:

obtain digital data corresponding to a plurality of text-based documents comprising a plurality of sentences;

remove digital data corresponding to at least one of symbols, special characters, and predefined stop words from each sentence of the plurality of sentences; and identify a category class ($C_i$) and a time class ($T_j$) to which each of the plurality of text-based documents is associated;

a semantic infusion module configured to:

determine, for each sentence of the plurality of sentences in each of the plurality of text-based documents, a number of words (L) in a respective sentence of the plurality of sentences;

compute an infusion frequency value (Ifreq) based on the number of words (L);

determine the Ifreq of non-consecutive random numbers from a set (0, (L−1)); and generate an infused sentence by inserting digital data corresponding to a word "A_class ($C_i$)_time ($T_j$)" prior to a word at a position in the respective sentence indicated by each of the determined non-consecutive random numbers;

a word vector module configured to generate digital data corresponding to a word vector for each word of each infused sentence of each of the plurality of text-based documents; and a pattern generation module configured to generate digital data corresponding to semantic trends by extracting the trending items from the word vector generated by said word vector module for each word of each infused sentence of each of the plurality of text-based documents, wherein the processing module is further configured to use the digital data corresponding to the generated semantic trends to perform text analytic activities on the digital data corresponding to the plurality of text-based documents.

7. The system as claimed in claim 6, wherein the word vector module is configured to generate the word vector using a Word2Vec technique.

8. The system as claimed in claim 6, wherein the semantic infusion module is configured to compute the Ifreq as one of $ceil\{(\log_2 L)/2\}$, $\{ceil\{\sqrt{(L)}\}\}$, $$\{ceil(\sqrt[3]{(L)})\},$$

and $\{ceil(L/2)\}$.

* * * * *